Patented Mar. 17, 1931

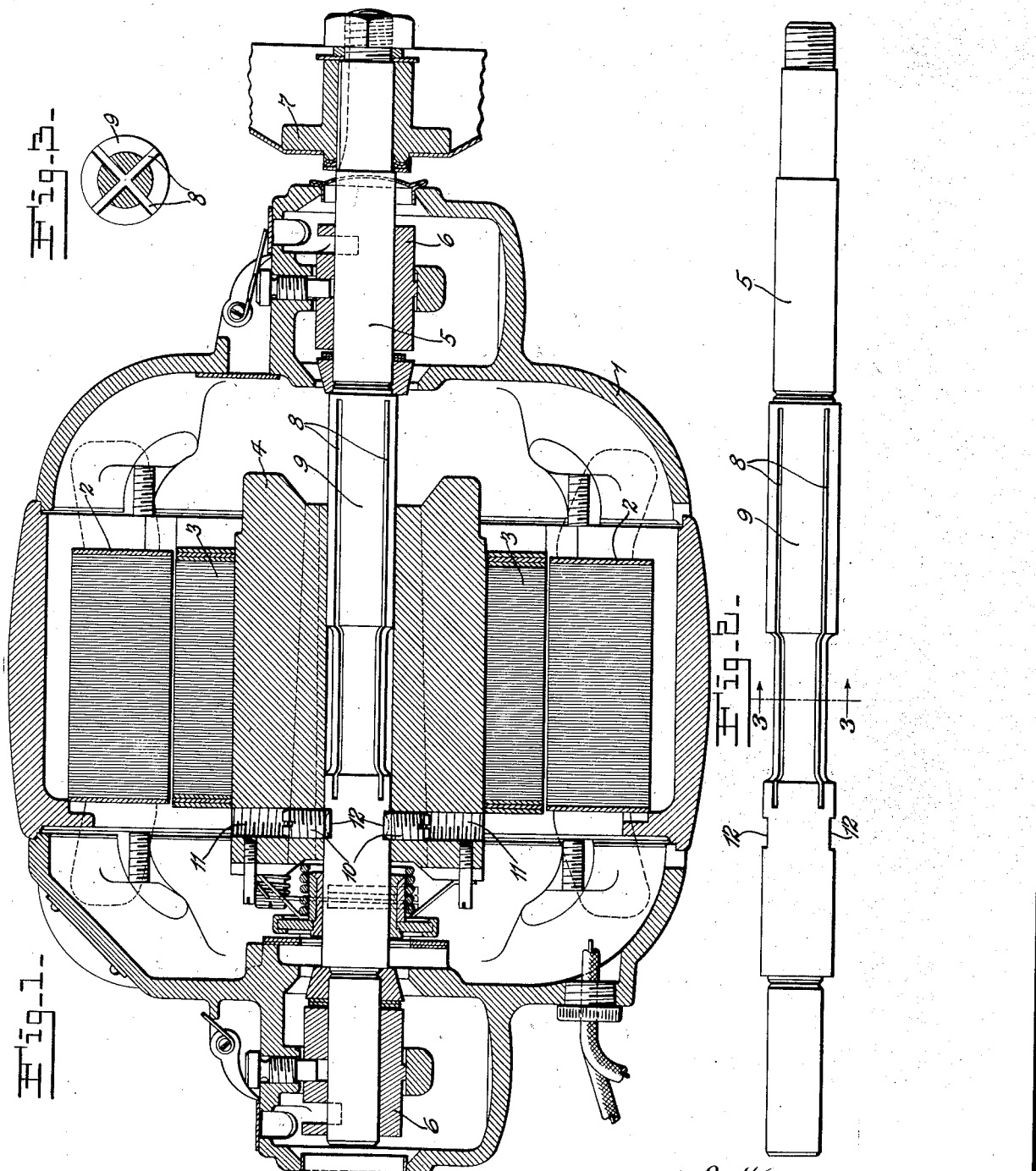

1,796,623

UNITED STATES PATENT OFFICE

JAMES A. RODGERS, OF ST. LOUIS, MISSOURI, ASSIGNOR TO THE EMERSON ELECTRIC MFG. CO., OF ST. LOUIS, MISSOURI, A CORPORATION OF MISSOURI

ELECTRIC MOTOR

Application filed November 22, 1928. Serial No. 321,166.

This invention relates to improvement in electric motors, and consists of the novel construction hereinafter disclosed.

In a construction in which a driven element is attached to the motor shaft difficulty has been experienced in preventing noise and vibration when the motor is in operation, particularly when the motor is operated at relatively high speeds. It is known that certain vibrations are set up in the motor which are transmitted to the driven element, and also that vibrations from the rotation of the driven element are transmitted to the motor. This is particularly true where the motor is used to drive a fan element.

It is the object of the present invention to provide a construction which, to a large degree, eliminates the usual operative noises inherent in structures of the class mentioned.

The object of the invention is accomplished by the structure hereinafter disclosed, reference being made to the accompanying drawing, in which—

Fig. 1 is a vertical section through the motor.

Fig. 2 is an elevation of the motor shaft.

Fig. 3 is a cross section on the line 3—3 of Fig. 2.

In the embodiment of the invention illustrated in the drawing, the motor structure is shown as comprising the conventional elements of a housing 1, field winding 2 and an armature 3, wound on a core 4.

The motor shaft 5 extends longitudinally through the core 4 and is journalled in bearing members 6 supported by the housing 1 of the motor. The extremity of the motor shaft 5 extends through the end of the motor housing, and the driven element 7, for example a fan, is connected thereto.

The improvement of the present invention consists in providing the motor shaft with a plurality of intersecting slots 8 that extend through the body of the shaft. The slots 8 extend longitudinally of the shaft and form segmental ribs 9, thereby providing an intermediate resilient section, a portion of which extends within the armature core 4 and a portion of which extends outwardly from the end of the armature core toward one of the bearings for the shaft.

In attaching the armature to the motor shaft, it should be noted that the armature core is fitted over the shaft and connected to the shaft by set screws 10 that are inserted through threaded openings 11 in the wall of the armature core. The armature shaft is formed with oppositely disposed flattened recesses 12 providing seats for the ends of the set screws 10. The connecting means between the armature core and the shaft are positioned as shown in the drawing (Fig. 1), that is to say beyond the resilient section of the shaft, so that the resilient section is between the point of connection and the driven element. This permits freedom of movement of the resilient section so that the resilient section functions to reduce the vibration between the armature and the driven element and from the driven element to the armature.

By slotting the shafts in the manner described a sufficient torsional and radial resiliency is imparted thereto to prevent the transmission of vibrations from the motor to the driven element and, also to prevent vibrations originating in the driven element from being imparted to the motor structure. The slotting of the shaft in the manner described does not weaken the shaft to any appreciable extent, but provides it with a sufficient flexibility to avoid transmission of vibration originating either in the motor structure or in the driven element.

It should be understood that I do not limit myself to any specific number of slots, nor to the exact position of the slots in the motor shaft. It has been found in practice that the provision of two intersecting slots passing entirely through the motor shaft as illustrated in the drawing, has been highly satisfactory in the accomplishment of the purposes of the invention; and, also, that the position of the slots, as shown in the drawing, provides an extremely satisfactory structure both from the standpoint of reducing vibration and noise, and from the standpoint of avoiding material weakening of the shaft structure. It is obvious, therefore, that the invention may be modified in various particulars without departing from the clear scope thereof.

What I claim and desire to secure by Letters Patent is:—

1. In a motor, the combination of a housing and an armature, with a shaft supporting the armature for rotation within the housing and said shaft having a section thereof formed with slots extending longitudinally of the shaft and transversely therethrough, and a driven element carried by said shaft.

2. In a motor, an armature, a driven element, and a shaft on which the armature and the driven element are mounted, said shaft having a torsional and radially resilient section between the armature and the driven element, said resilient section comprising a plurality of separated ribs integrally joined at their extremities.

3. In a motor, the combination of a motor shaft provided with intersecting longitudinal slots through the body thereof intermediate of its extremities, a driven element attached to one end of said shaft, and an armature the core of which is mounted upon and secured to the shaft and so positioned in respect of the shaft that a portion of the slotted section thereof is within the armature core.

4. In a motor, the combination of a motor housing, a motor shaft journaled for rotation in the housing, said motor shaft having a section formed from separated segments by slots passing transversely through the body of the shaft, said slots being disposed intermediate of the length of the shaft, a driven element carried by one end of the shaft, and an armature supported by the intermediate portion of the shaft in such a manner that the portion of the shaft formed from said separated segments is within the armature and a portion between the end of the armature core and the shaft bearing, whereby the transmission of vibration from the motor to the driven element and from the driven element to the motor is reduced.

5. In a motor, the combination of a motor shaft having a section comprising a plurality of separated ribs integrally joined at their extremities to provide a torsional and radial resiliency, an armature having a core mounted over a portion of the resilient section of the shaft, and a driven element attached to the end of the shaft.

6. In a motor, the combination of a housing having shaft bearings therein, with a motor shaft having solid cylindrical extremities and a plurality of intermediate separated ribs integrally formed with said extremities, an armature mounted on the shaft and having the core thereof supported over a section of the ribbed portion of the shaft, and a driven element supported at one extremity of said shaft.

7. In a motor, in combination an armature, a shaft having a resilient section supporting said armature, a connection between the armature and the shaft, and a driven element, said resilient section of the shaft being located between said connection and said driven element and comprising a plurality of separated ribs integrally joined at their extremities.

8. In a motor, the combination of an armature, with an armature shaft having a torsionally resilient section comprising a plurality of separated ribs integrally joined at their extremities, a driven element supported by the shaft, and a connection between the armature and shaft so positioned that the torsional resilient section of the shaft is intermediate of the connection and the driven element.

JAMES A. RODGERS.